| (12) | United States Patent<br>Prutzman et al. | (10) Patent No.: US 7,861,345 B2<br>(45) Date of Patent: Jan. 4, 2011 |
|---|---|---|

(54) APPARATUS FOR RESHAPING FOOTWEAR

(75) Inventors: Paul J. Prutzman, Reading, PA (US); Cullen L. Speakman, Reading, PA (US)

(73) Assignee: Outside The Box Designs, Ltd, Reading, PA (US)

( * ) Notice: Subject to any disclaimer, the term of this patent is extended or adjusted under 35 U.S.C. 154(b) by 866 days.

(21) Appl. No.: 11/710,105

(22) Filed: Feb. 24, 2007

(65) Prior Publication Data
US 2007/0200264 A1   Aug. 30, 2007

Related U.S. Application Data

(60) Provisional application No. 60/777,181, filed on Feb. 27, 2006.

(51) Int. Cl.
| A43D 11/00 | (2006.01) |
| A43D 5/00 | (2006.01) |
| A23G 1/22 | (2006.01) |
| A01J 21/02 | (2006.01) |
| A01J 25/12 | (2006.01) |
| B29C 45/76 | (2006.01) |
| B29C 59/02 | (2006.01) |
| B29C 51/08 | (2006.01) |

(52) U.S. Cl. .......... 12/53.5; 425/119; 425/383; 425/384; 12/53.1; 12/115.4; 264/40.1; 264/320; 264/322

(58) Field of Classification Search ............ 425/119, 425/383, 384; 12/115.4, 53.1, 53.5; 264/40.1, 264/320, 322

See application file for complete search history.

(56) References Cited

U.S. PATENT DOCUMENTS

| 3,977,034 A | 8/1976 | Brown |
| 5,732,428 A * | 3/1998 | Brown .................. 12/115.4 |
| 6,170,177 B1 | 1/2001 | Frappier et al. |

OTHER PUBLICATIONS

Ultracam Operating Manual, Wintersteiger, Jan. 22, 2004.*
Ultracam Universal Expanding device for ski boots distributed by Wintersteiger, 4705 W Amelia Earhart . Distributed by WiSalt Lake City, UT 84116. (3-pages).

* cited by examiner

*Primary Examiner*—Monica A Huson
*Assistant Examiner*—Michael T Piery
(74) *Attorney, Agent, or Firm*—Harold I. Masteller, Jr.

(57) ABSTRACT

The present invention is directed to apparatus and a method for reshaping a footwear shell, the apparatus includes a support structure, a drive mechanism and external mold arrangement that drives the external mold toward or away from the shell being reshaped; and an internal mold assembly that includes an angled support arm having a first leg adapted to couple to one of a selection of couplings provided in the support structure and a second leg offset from the first leg at an angle θ. The internal mold assembly also includes an adapter that is rotatably fixed to the second leg of the angled support arm, and a static mold removably fixed to the adapter and coaxially aligned with a common axis extending through the external mold and static mold, the support arm angle θ provides an improved support shape that improves placement of the static mold within the footwear shell during reshaping.

18 Claims, 10 Drawing Sheets

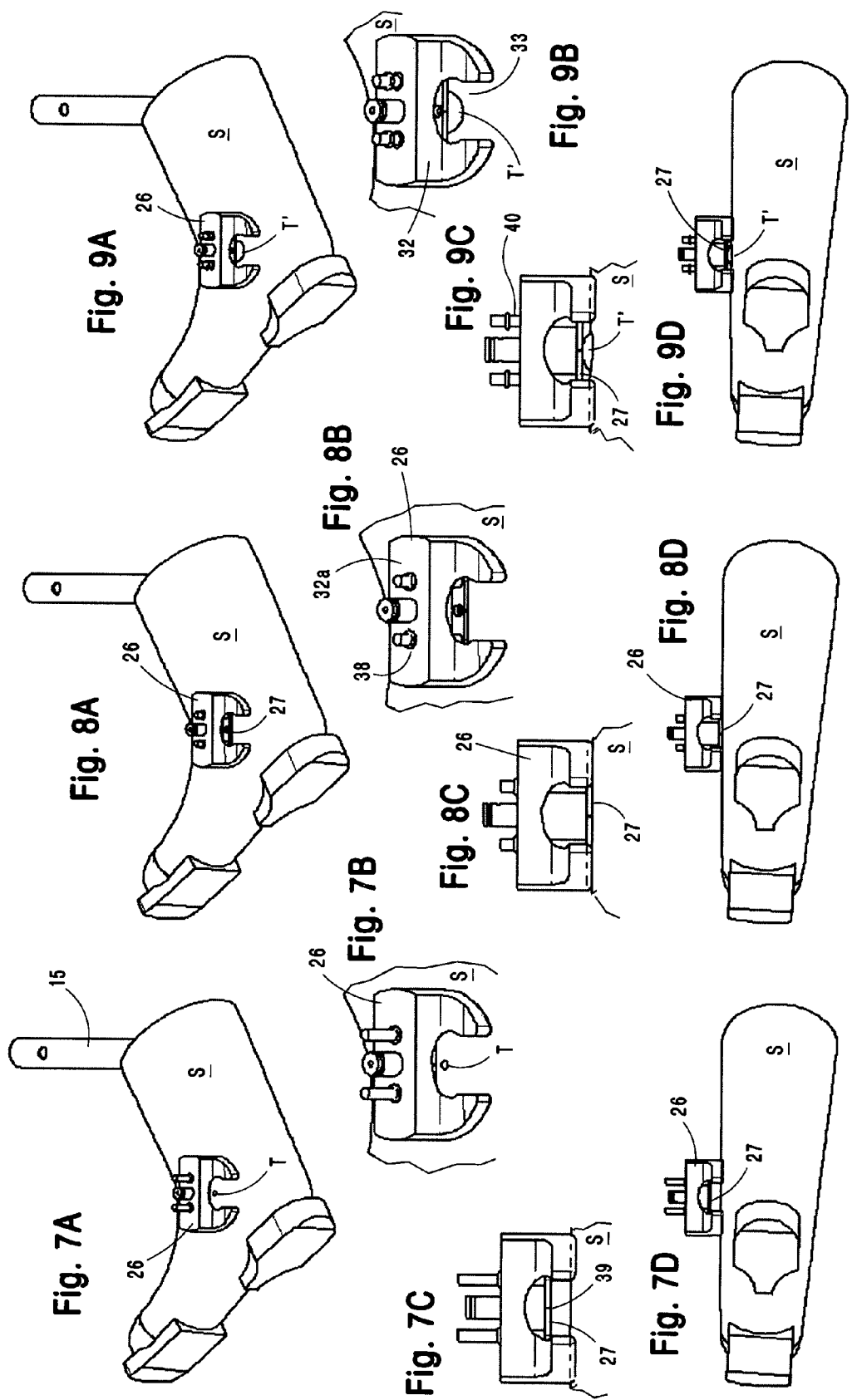

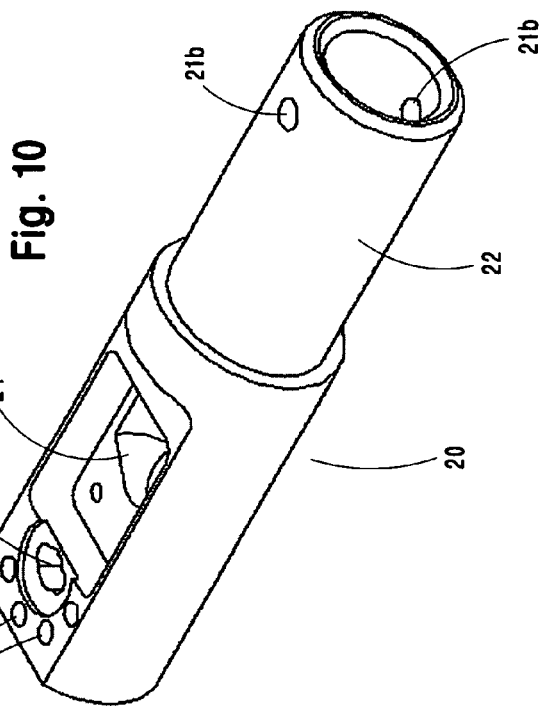
Fig. 10
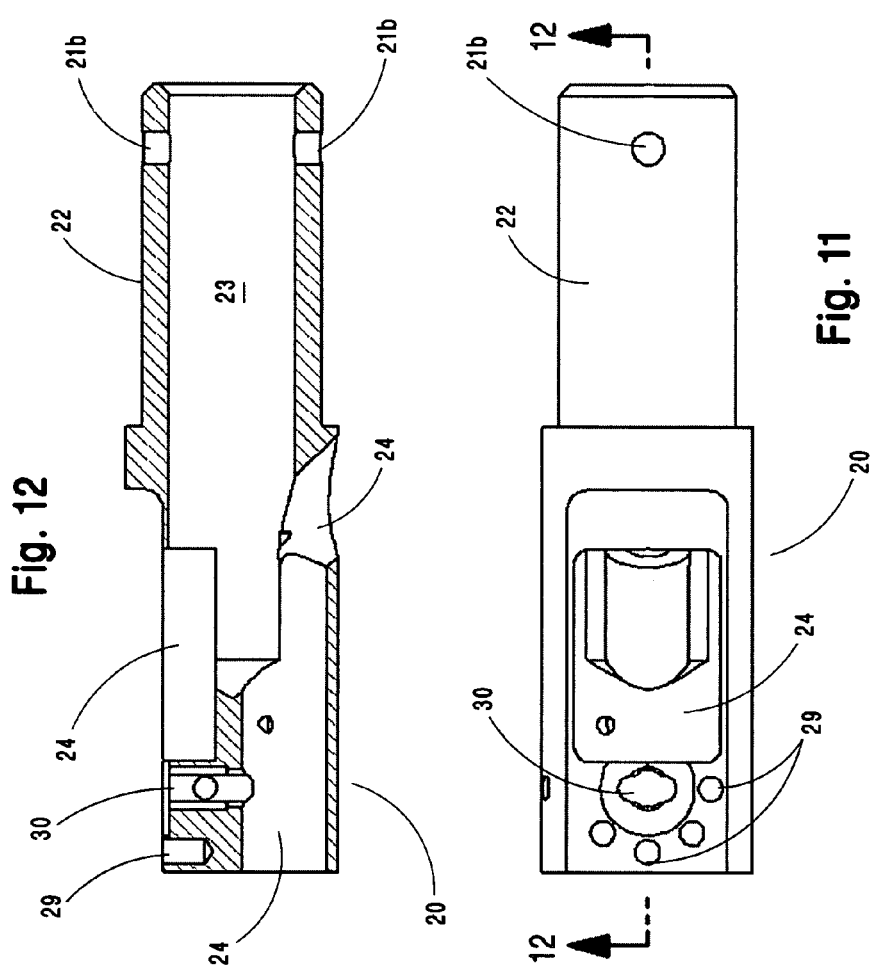
Fig. 12
Fig. 11

26a

26b

Fig. 15
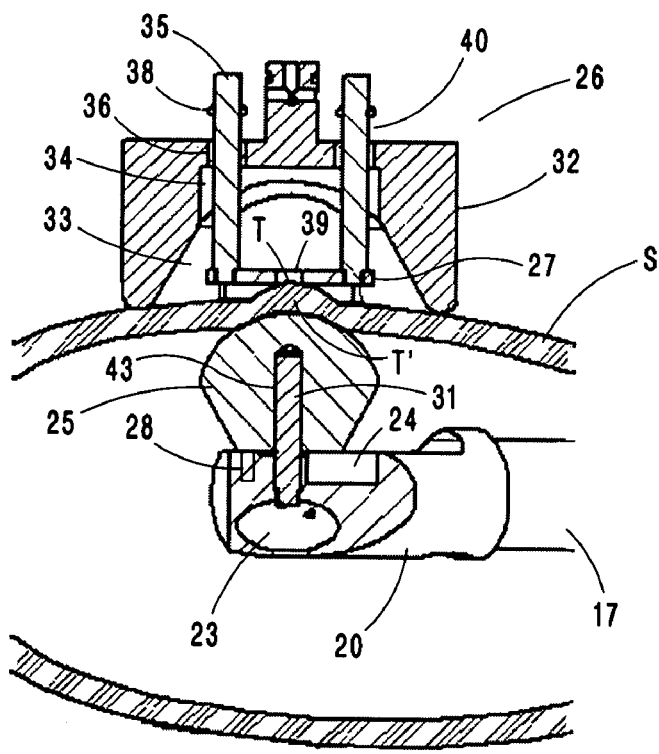
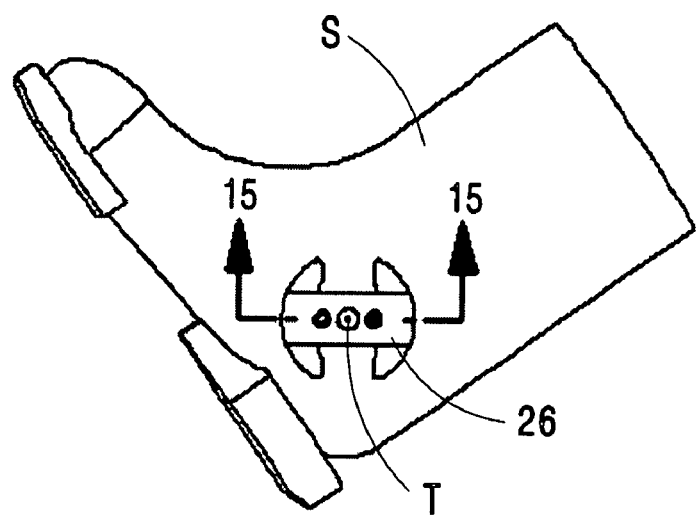
Fig. 14

APPARATUS FOR RESHAPING FOOTWEAR

This non-provisional patent application claims priority from U.S. Provisional Patent Application 60/777,181, filed Feb. 27, 2006.

FIELD OF THE INVENTION

The present invention is directed to apparatus that provides localized reshaping or stretching of footwear, and in particular to apparatus for reshaping the upper or shell that covers the top part of the foot from heel to toe as related to shoes, boots, ice skates and the like, and particularly to uppers or shells manufactured from stretchable or thermoplastic materials that facilitate reshaping to accommodate the shape, size and structure of a foot. The apparatus of the present invention comprises a stationary angled support arm in combination with a replaceable mold device, the combination support arm and mold adapted to be positioned inside the upper or shell of footwear, a second or external mold device supported in aligned juxtaposition to the internal mold on the exterior side of the upper or shell and adapted to apply pressure to the shell against resistance of the internal mold. In preferred embodiments, the internal support arm comprises two legs rigidly connected at an angle such that the supported internal mold can be positioned at a selected location within the interior of the footwear shell or upper. The preferred embodiment includes means to provide controlled heating to either or both of the internal and external molds to facilitate reshaping the upper or shell. The complementary external mold, is aligned in juxtaposition with the internal mold, provides means for applying controlled pressure at the exact location of the internal mold so that precise localized stretching or reshaping is achieved at the selected portion of the footwear shell. In other words, the external moveable mold, aligned with the internal static mold, provides improved mechanical reliability, improved localized temperature control along the heated mold surface, and improved stretching or reshaping of the shell portion that is contiguous with the selected internal mold position.

Various devices have been used in the past to stretch the shell of boots to fit the shell to the shape, size, and structure of the user's foot. One such device is shown in U.S. Pat. No. 3,977,034, Aug. 31, 1976. The patent discloses a hydraulic cylinder inserted into footwear and operated to extend pistons that apply an internal force against the shell in opposite directions (FIG. 16). Heat is applied along the outside shell portion where reshaping is to occur (FIG. 3), and some stretching will occur along the side opposite the heat source. In the alternate embodiment (FIG. 19), the expandable member is attached to a straight support arm that is inserted into the shell. Such devices cannot be positioned at all locations within footwear shells, especially when the footwear is a type of boot.

U.S. Pat. No. 6,170,177 also discloses a footwear press that uses straight support arms to position reshaping devices within the upper or shell, the straight support limiting placement within the article being reshaped.

One boot fitting device that is currently available in the market place is the "Ultracam" workstation sold by "Backshop Accessories." The present inventors have used the Ultracam workstation to reshape or stretch ski boot shells at their retail operations, and they have identified various problems associated with the Ultracam boot fitting apparatus that are overcome with the present invention. First, similar to the problem mentioned in the above prior art, Ultracam uses a straight support arm to insert an interior mold into the boot shell. This makes it difficult, and in some instances impossible, to reach specific localized target areas within the shell that need reshaping or stretching. In addition, the mold is a shoetree like shape that fills a large amount of the interior space within the boot shell. When heated, the large mold raises interior and exterior surface temperature from the toe to heel portions of the shell during the stretching process. The combined heating, stretching and cooling process takes about forty-five minute to an hour to complete the Ultracam boot fitting operation. Because the present invention targets a specific area to be reshaped, and because the improved interior mold assembly applies heat only to that target area, the inventors are able to heat, reshape, and cool the upper or shell within a period of about ten minute or less. Furthermore, the Ultracam apparatus is not able to target a specific target area for reshaping and the operator needs to estimate where stretching is needed. This often results in stretching a large generalized area of the shell or stretching an incorrect area that did not need stretching. The present invention overcomes this problem by providing a location device that accurately positions the exterior and interior reshaping molds at the exact selected target area on the footwear.

SUMMARY OF THE INVENTION

Accordingly, it is a first object of the present invention to provide apparatus and a method for inserting and supporting an internal static mold at an identified target area within an upper or shell of footwear.

It is another object of the present invention to provide apparatus and a method capable of locating the identified target area and supporting a moveable external mold that is vertically aligned with the internal static mold.

It is another object of the present invention to provide apparatus and a method for applying heat to the static internal mold and/or to the moveable external mold.

It is a further object of the present invention to provide apparatus and a method that operates the moveable external mold so that a controlled pressure is applied against the static internal mold, the applied pressure causing reshaping or stretching of the upper or shell portion at the localized target area.

It is another object of the present invention to provide apparatus and a method that accurately locates the target area when positioning the moveable external mold.

It is a further object of the present invention to reduce the time required to heat, reshape, and cool the upper or shell during the footwear reshaping process.

In satisfaction of the foregoing objects and advantages, the present invention includes apparatus and a method for reshaping a footwear shell, the apparatus includes a support structure, a drive mechanism and external mold arrangement that drives the external mold toward or away from the shell being reshaped; and an internal mold assembly that includes an angled support arm having a first leg adapted to couple to one of a selection of couplings provided in the support structure and a second leg offset from the first leg at an angle θ. The internal mold assembly also includes an adapter that is rotatably fixed to the second leg of the angled support arm, and a static mold removably fixed to the adapter and coaxially aligned with a common axis extending through the external mold and static mold, the support arm angle θ provides an improved support shape that improves placement of the static mold within the footwear shell during reshaping.

BRIEF DESCRIPTION OF THE DRAWINGS

FIG. 1 is an isometric view of the preferred embodiment of the present invention showing the internal support arm and mold positioned to reshape the left side of a shell or the like.

FIG. 1A is a top plan view of the preferred support arm shown in FIG. 1.

FIG. 3 is an isometric view showing the internal support arm and mold positioned to reshape the right side of a shell or the like.

FIG. 4 is an isometric view showing the internal support arm and mold positioned to reshape the toe portion of a shell or the like.

FIG. 6 is a side elevation view of an alternate support arm adapter used to reshape the toe portion of a shell or the like.

FIGS. 7A-7D show the external movable mold generally aligned with the shell target mark.

FIGS. 8A-8D show the locating device precisely aligned with the shell target mark.

FIGS. 9A-9D show the locating device repositioned within the external mold in response to reshaping the shell target area.

FIG. 10 is an enlarged isometric view of a support arm adapter.

FIG. 11 is a plan view of the adapter shown in FIG. 10.

FIG. 12 is a cross-section view taken along the lines 12-12 of FIG. 11.

FIG. 14 is a plan view showing the external mold applying pressure against the internal mold during reshaping or stretching.

FIG. 15 is a cross-section view taken along the lines 15-15 of FIG. 14.

DETAILED DESCRIPTION OF THE INVENTION

Figure 1:
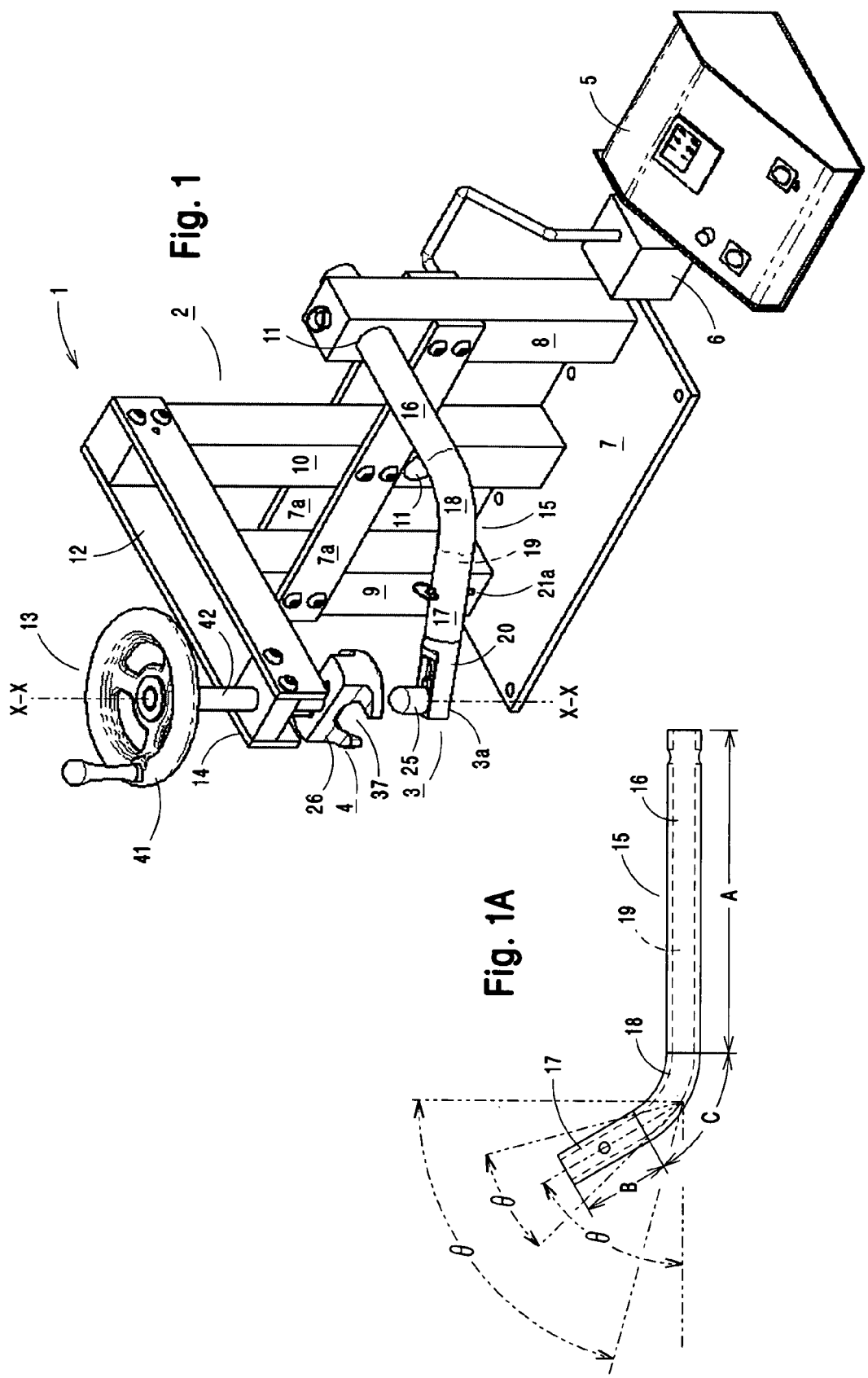
Figure 2:
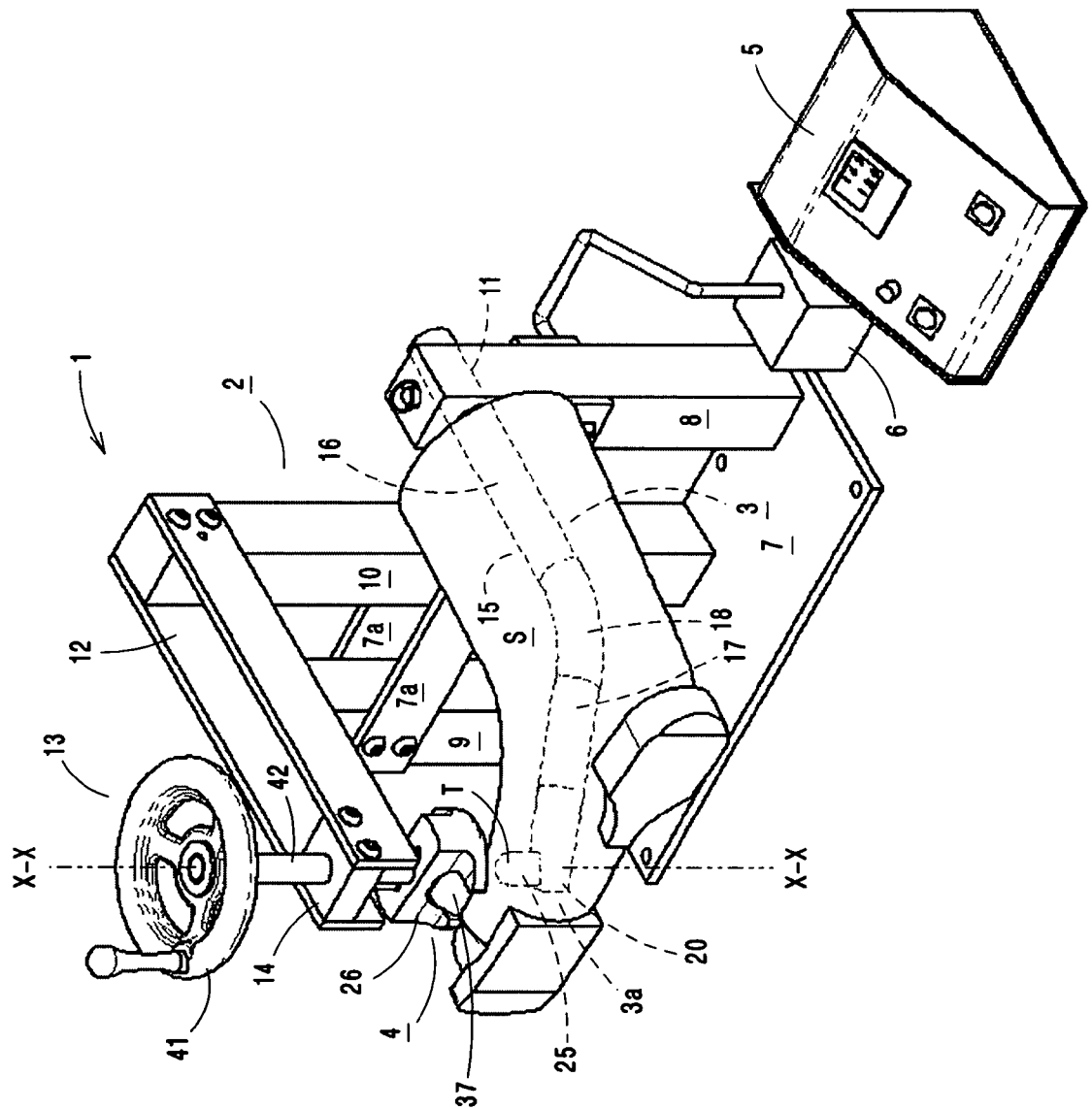
FIG. 2 is an isometric view showing the internal support arm and mold of FIG. 1 positioned within a shell.
Figure 3:
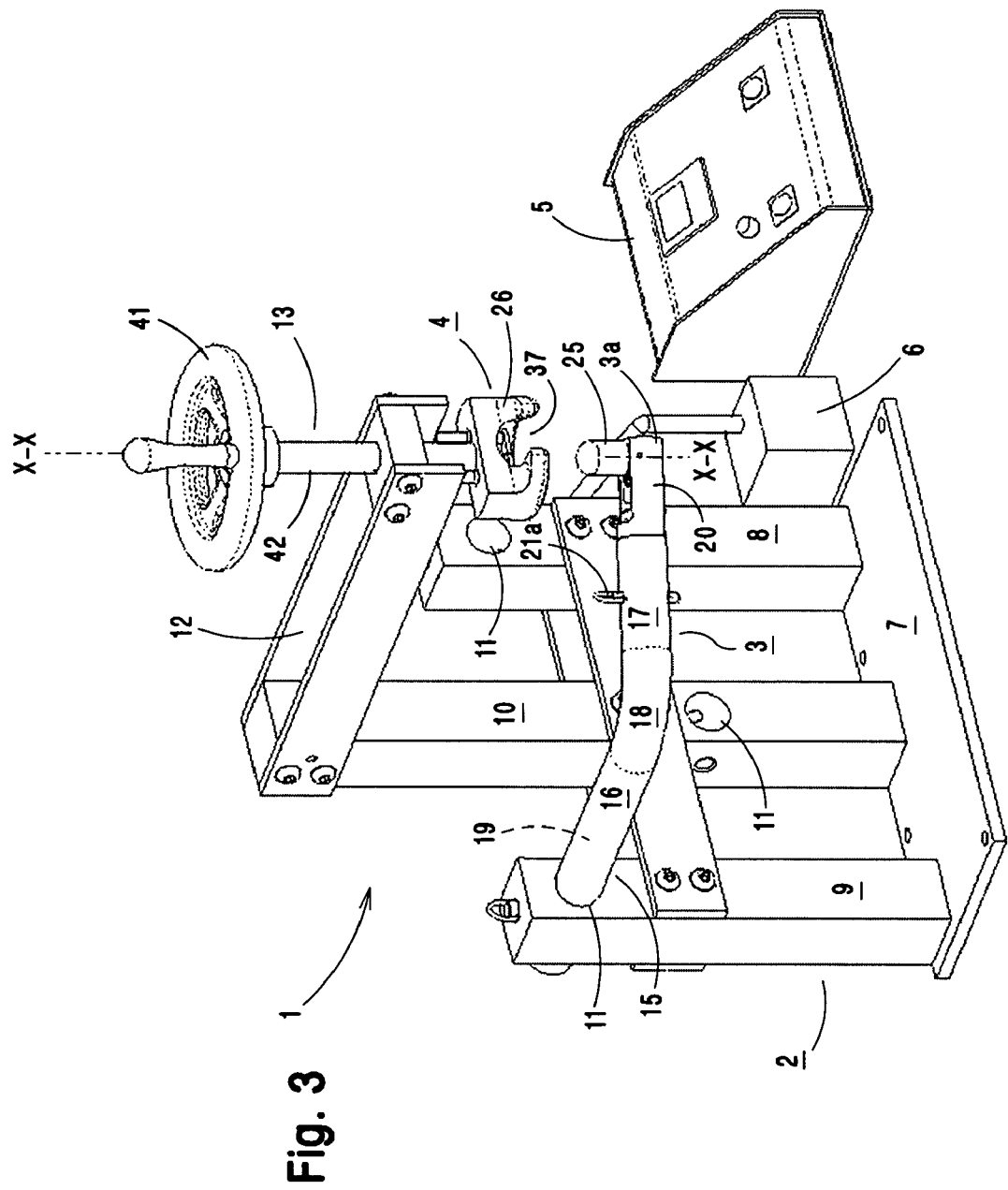

Referring to FIGS. 1-3 of the drawings, the preferred embodiment of the present invention is directed to a footwear reshaping device 1 that imparts localized reshaping or stretching to the upper or shell portion S of shoes, boots, ice skates, and like footwear, and it is particularly suitable for reshaping or stretching footwear uppers or shells made from either stretchable or thermoplastic materials so that the reshaped portion accommodates the shape, size and structure of a particular foot. The footwear reshaping device 1 comprises a support structure 2, an interior static mold assembly 3, an exterior moveable mold assembly 4, a control box subassembly 5 capable of providing an energy source that provides heat to either the interior mold assembly 3 and/or the exterior mold assembly 4, and controlling a coolant source 6 to reduce the heated mold temperature and footwear when the reshaping or stretching process is completed.

The support structure 2 includes a base plate 7 and at least three spaced apart vertical frame members 8, 9, and 10, each frame member attached to and extending in an upward direction from base plate 7. The frame members are attached to the base plate with screws, and stabilized with a cross support plate 7a. Frame members 8, 9, and 10 include apertures 11 into which the static mold assembly 3 is selectively coupled or attached so that the interior mold assembly 3 is supported in a left side, right side, or toe position when inserted into a shell S of the footwear being reshaped or stretched. Frame member 10 is positioned at an equally spaced distance between the frame members 8 and 9, and member 10 includes a cantilevered arm 12 that extends in an outward direction toward the working or mold end 3a of the coupled interior static mold assembly 3 that is demountably coupled within aperture 11 provided in either frame member 8 or frame member 9. A drive mechanism, shown generally as 13 is attached to and positioned proximate the extended end portion 14 of arm 12 to provide means for driving the external mold assembly in a vertical direction toward or away from the working or mold end 3a of the coupled interior mold assembly 3.

Referring again to the above mention drawing figures, and in particular to FIG. 1A, the internal static mold arrangement 3 includes a support arm 15 comprising a first leg 16, a second leg 17, and an elbow 18 interposed between and fixed to leg 16 and leg 17, so that the leg second leg 17 is offset from first leg 16 at an angle θ. Angle θ is between about 15° and about 90°, with a preferred angle range between about 45° and about 75°, and a preferred angle of about 60°. The second end of leg 16 is adapted to demountably couple within the apertures 11 provided in the frame members 8, 9, and 10.

Referring to FIG. 2, the curved or angled support arm 15, intersects the axis of force X-X on a plane that is perpendicular to the axis X-X. The intersecting perpendicular plane provides a reach, i.e. a range of influence or effect within one piece footwear heretofore unavailable in prior art reshaping devices, and the perpendicular curved or angled, demountable support arm enables placement of the internal static mold at positions within the shell that are unobtainable with the prior art devices. This is especially advantageous in instances where high top, one piece boots such as alpine ski boots are being reshaped, and in particular where reshaping is required near the toe areas of the boot shell. While less important for low topped shoes, the angled support arm 15 is still advantageous over a straight internal support arm used by the prior art devices. As clearly shown in FIGS. 2 and 3, support arm 15 is selectively and demountably coupled to either frame member 8 or frame member 9 at an offset or plane that is perpendicular to the axis of force X-X that extends through drive mechanism, external mold 26, and the internal mold 25 demountably fixed to the curved or angled support arm 15. Both molds 25 and 26 are coaxially aligned with the axis of force X-X while the curved or angled support arm is perpendicular to axis X-X.

The curved support arm 15 comprises a hollow tube that provides a conduit 19 for delivering coolant to the mold adapter 20 at the second end of leg 17. In the preferred embodiment, the present invention comprises a control system housed in the control box subassembly 5 to precisely control mold and shell temperature through heating and cooling cycles. The control system communicates with a thermocouple disposed within or on the adapter, which supports the internal mold. The system comprises any commonly available temperature control means known in the art, such as analog or digital temperature controller devices, to control the mold temperature. The control box subassembly includes an appropriate electrical enclosure box, a light source to alert the operator that the internal mold has reached a preselected operating temperature. The preselected temperature ranges between about 75° C. and about 125° C., depending upon the particular material used to manufacture the footwear shell. The control box also includes a mode switch for selection between heating, cooling, means to indicate the heating or cooling status, and a power switch. The cooling system includes a coolant source 6 adapted to reduce the temperature of the external mold 26 and/or the internal mold 25 after reshaping is completed.

The preferred coolant is compressed air; however, any suitable cooling substance may be used without departing from the scope of the present invention. The coolant source 6 supplies compressed air in response to a signal received from the control system described above and delivers coolant to the interior mold through conduit 19 provided in the internal mold assembly 3, and delivers coolant to the external mold surface through tubing that extends to a position proximate the mold. It is within the skill of those in the art to use either an electronically controlled cooling system or a manually operated cooling system. In the case where the internal support arm is hollow tubing, the cooling air can be injected into the internal support arm at its end where it is attached to the frame members 8, 9, or 10. Either this can be accomplished by using a compressed air supply 6, or by using a conventional blower connected to direct an air flow through conduit 19 to the region of the internal mold and onto the adjacent interior portion of the shell.

As disclosed above, the internal support arm 15 is constructed of hollow metal tubing to provide conduit 19, and cooling air is delivered to the adaptor and internal mold through the arm. However, a solid rod could be used to provide strength. In such an embodiment, thermocouple and cooling conductors would extend along the exterior of the solid support arm. It is important for the internal support arm to have sufficient section properties to withstand the bending moment generated by the downward force applied during the reshaping process. In a preferred embodiment, the support arm is fabricated of steel tubing having a nominal diameter of about 2½ cm. Many mechanical adaptations of the internal support arm, whether straight or angled, are available to those skilled in the mechanical arts without diverting from this invention.

Of particular advantage of the present invention is the juxtaposition of the external mold in alignment with the internal mold supported at the end of the internal support arm with the pressure and movement of the opposing molds applied by the external mold. This has several distinct advantages. With the juxtaposition and alignment of the complementary external and internal molds, precise location of the internal mold can be achieved by the operator. The operator can determine the precise location of any stretching or reshaping required to fit the footwear to the wearer by reference to the exterior of the boot, and then place the boot such that the external mold is precisely located at that point. This insures the internal mold will be located inside the shoe or boot shell at the desired location.

With respect to the internal support arm dimensions shown in FIG. 1A, in consideration of alpine ski boots currently on the market, we have discovered that in order to position the interior static mold 25 at any desired location within the shell, the support arm that provides both convenient access to the interior of such a boot and ease of reshaping has a leg 16 length "A" of between about 15 cm and about 30 cm, with a preferred length of about 20 cm, a leg 17 length "C" between about 5 cm and about 15 cm, with a preferred range between about 8 cm and about 10 cm, and arc length "B" about equal to the range of lengths for dimension "C". The arc length "B" is determined primarily by the tubing or rod diameter used to fabricate 15, and the Arc length is chosen to provide an adequate bending radius that avoids kinking or crushing when forming the bend.

Referring to FIGS. 10-13, the mold adapter 20 is rotatably and releasably fixed to the second end of leg 17 with a pin 21a, (FIGS. 1 and 3) inserted through apertures 21b provided in the reduced diameter end portion 22 that slidably fits within the conduit 19. The releasable connection enables operators to rotate adapter 180° for reshaping either the left side or the right side of an upper or shell when the static mold assembly 3 is coupled to the frame members 8 or 9 respectively. It should be understood that any connection, such as a threaded connection, or the like, may be used to fix adapter 20 within the conduit extending through leg 17 without departing from the scope of the present invention. Adapter 20 includes a chamber or passageway 23 that communicates with the conduit 19, and orifices or ports 24 extend from chamber 23 to the outside surface of adapter 20 to deliver coolant to the heated interior static mold 25 (FIGS. 1-3) and to the heated target area T of the upper or shell after reshaping is completed. An indexing pin 28, (FIG. 15), extends from the internal mold 25 and is selectively inserted into one of a plurality of indexing apertures 29 radially spaced apart about a common axis X-X so that the internal mold may be rotated to a selected position that provides customized shell reshaping for a particular foot. Aperture 30 is shaped to receive and interlock with a pin 31 that can include a heating element attached to heat source 5 that regulates the temperature of mold 25 during the reshaping or stretching process. Mold 25 is demountably attached to adapter 20 so that any one of a selection of different convex shaped static molds, as exemplified in molds 25a through 25c shown in FIG. 13, may be selectively attached to adapter 20 to provide customized reshaped fit to the particular foot shape, size, and/or structure of the person wearing the footwear. It should be understood that molds 25a through 25c are only examples of different mold shapes, and that any static mold and exterior complementary mold shape may be used without departing from the scope of the present invention.

Figure 13A:
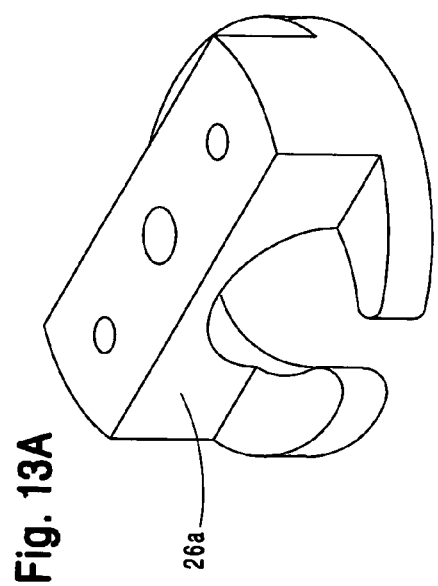
FIG. 13 is an isometric view showing the internal support arm adapter and selection of internal static molds.
Figure 13B:
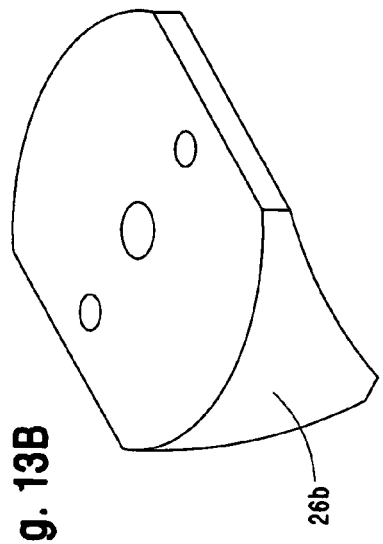
Figure 13:
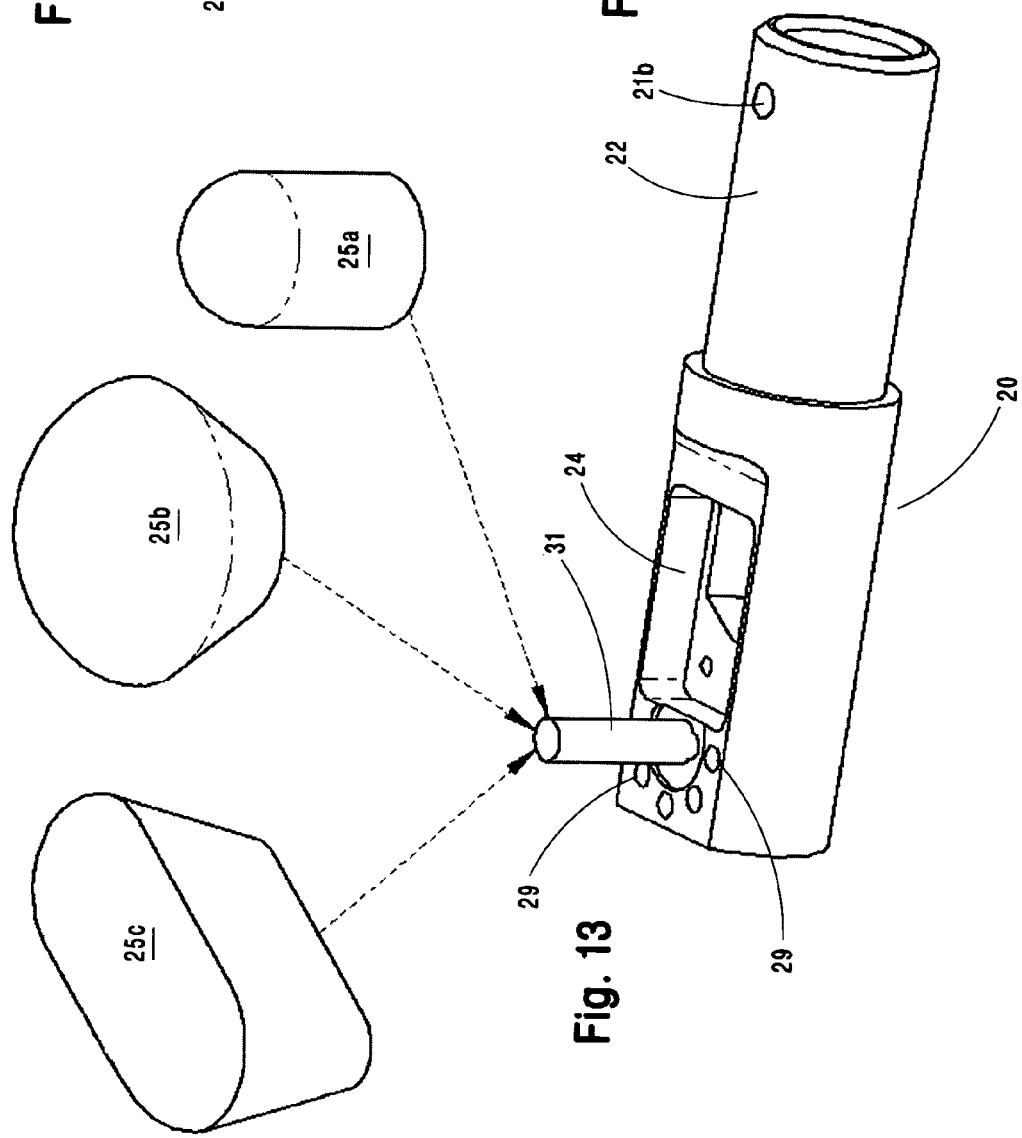

Referring to FIGS. 13, 13A, and 13B, various shapes of external moveable molds, for example molds 26a, and 26b and various shapes of the internal static molds 25a, 25b, and 25c can be selected to customize the reshaping process to a particular foot shape, size, and/or structure. The internal mold examples 25a-25c show a selection of elliptical molds and round molds. Other shapes particularly suited to different types of footwear uppers or shells that facilitate proper positioning and reshaping or stretching can be used without departing from the scope of the present invention. The molds are generally either cast or machined from materials that provide good thermal conductivity, for example aluminum, copper, brass, and the like. As shown in FIGS. 13 and 15, the internal static molds 25a-25c include a centered hole 43 for receiving pin 31 that attaches the mold to the adaptor 20 on the internal support arm 15. Other methods of attachment, for example a detent shaft or screw attachment would be equally advantageous, depending upon fabrication costs and frequency of mold changes. An indexing pin 28 extends in a downward direction from the bottom surface of the non-circular molds such as the elliptical molds, and pin 28 engages the apertures or indexing holes 29 provided in adapter 20 to provide a selected rotated mold for custom reshaping of the footwear shell.

Referring again to FIGS. 1-5, the exterior moveable mold assembly 4 includes the drive mechanism 13 attached to and the end portion 14 of arm 12. A concave shaped mold 26 provides a complementary pressing device or mold on the exterior side of the footwear upper or shell S. Mold 26 is supported by the drive mechanism 13 in juxtaposition to the internal convex shaped static mold 25, and drive mechanism 13 provides means to move the concave shaped mold 26 vertically in a downward direction so that pressure is applied to the shell S against resistance provided by the convex shaped static mold 25. It should be understood, that as used in this description, the terms 'complementary pressing device' or 'complementary mold', refer to molds that have generally mating shapes with allowances for the thickness of the footwear upper or shell being stretched or reshaped. Such complementary pressing devices or complementary molds are coaxially aligned along a common axis X-X as shown in the drawings. However, it should be understood that, although the preferred embodiment shows a vertical common axis X-X, any common axis angle may be used to align the complementary device or mold without departing from the scope of the present invention.

Referring to FIG. 15, mold 26 comprises a cast or machined body 32 having a concave shaped cavity that provides a complementary mold surface 33 to static mold 25, and a rectangular pocket 34 that communicates with the convex recess 33. Pocket 34 is shaped to receive and house a moveable locater plate 27 used to position precisely mold 26 at the target area T prior to heating and reshaping. The locater plate includes a centrally located aperture 39 that extends through the locater plate 27 to provide a line of sight to the target T marked on the upper or shell S of the footwear. It should be understood, however, that any suited sighting devise, such as a pin, bead, v-notch, or the like may be used without departing from the scope of the present invention. Locater plate 27 is supported on one or more measurements shafts 35 that slideably extend through apertures 36 provided in the mold body 32. The mold body apertures 36 extend from pocket 34 to the top surface 32a of mold 26 so that the locater plate may be moved vertically toward or away from shell S before and/or during the stretching or reshaping operations. The measurement shafts 35 may be scribed circumferentially or calibrated with depth indicator lines along the length of the shaft to provide a linear measure indicative of an amount of change in shell shape during the reshaping process. Flexible O-rings 38 are fixed to each measurement shaft to provide stops that limit the downward movement when the locater plate is extended. In the preferred embodiment, the external moveable mold 26 includes at least one cut-out or relieved portion 37 (FIG. 1-3) to provide operator access for viewing the locator plate within the concave recess 33 and to provide a clear line of sight through the centrally located locator plate aperture 39 to the target T when the locater plate is in an extended position over the target.

Referring to FIGS. 7A-7B and 14-15, in order to position the complementary pressing device or mold 26 at the exact marked target area T, where shell reshaping or stretching is required, and in order to precisely control the amount of shell stretching that occurs at the target area, an external mold having a shape that complements or generally corresponds to the shape of the selected internal mold is attached to drive mechanism 13 shown in FIG. 1. The footwear upper or shell is slid over the internal support arm 15 to position the internal mold 25 (FIG. 15) near the target area, and drive mechanism 13 is operated to lower mold 26 to a position proximate target T so that the operator is able to view the marked target T through aperture 39 in the locater plate. When the aperture is centered on target T, (FIGS. 7C-7D) drive mechanism 13 is operated to bring the external mold into contact with shell S. If the locater plate is not contacting the shell surface, the measurement shafts 35 are pushed in a downward direction (FIGS. 8A-8D) so that the locator plate 27 is in contact with the exterior of the shell at the start of the stretching or reshaping operation. The O-rings 38, shown more clearly in FIG. 15 are moved in a downward direction to contact the top surface 32a of the external mold. Referring now to FIGS. 9A-9D and 14-15, the drive mechanism is operated so that external mold 26 applies a force against the outside surface of shell S. In the exemplary drive mechanism shown in FIGS. 1-5, a hand wheel 41 is rotated to drive mold 26 along the common vertical axis X-X, i.e. the axis of force. The downward pressure exerted by the external mold, in combination with the resistance provided by the static internal mold 25, forces the reshaped shell target area T' into the shaped recess 33 within mold body 32. The inward moving shell portion causes locator plate 27 to move in an upward direction within recess 33, and the amount of movement is indicated by gap 40 between the O-rings 38 and the top surface 32a of the external mold 26. The indicator lines on the measurement shafts 35 assist an operator in determining the amount of stretching or reshaping that has occurred. With the present invention, precise amounts of stretching or reshaping can be reliably controlled and measured, especially in conjunction with the hand wheel 41 and drive shaft assembly 42 that provides means to control carefully the amount of pressure required for precise stretching or reshaping.

The improved pressure and heat control, in combination with exact target location enables the reshaping of footwear with the reduced possibility of excessive deformation or even punch through of the shell that would result in costly loss.

While this embodiment shows a drive mechanism comprising a hand wheel 41 and screw shaft 42, any suitable drive device including levers or hydraulic means may be used. However, one advantage of the hand wheel and screw shaft assembly is simplicity in fabrication; another advantage is its ease of control. For example, once pressure is applied and a desired amount of reshaping is accomplished, drive mechanism 13 reliably holds the pressure at a relatively constant level, while the internal mold continues to heat the shoe or boot shell from the inside and while the internal mold and interior of the shoe or boot shell is subsequently cooled.

Figure 6:
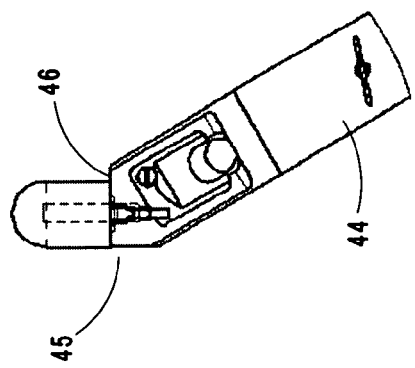
Figure 4:
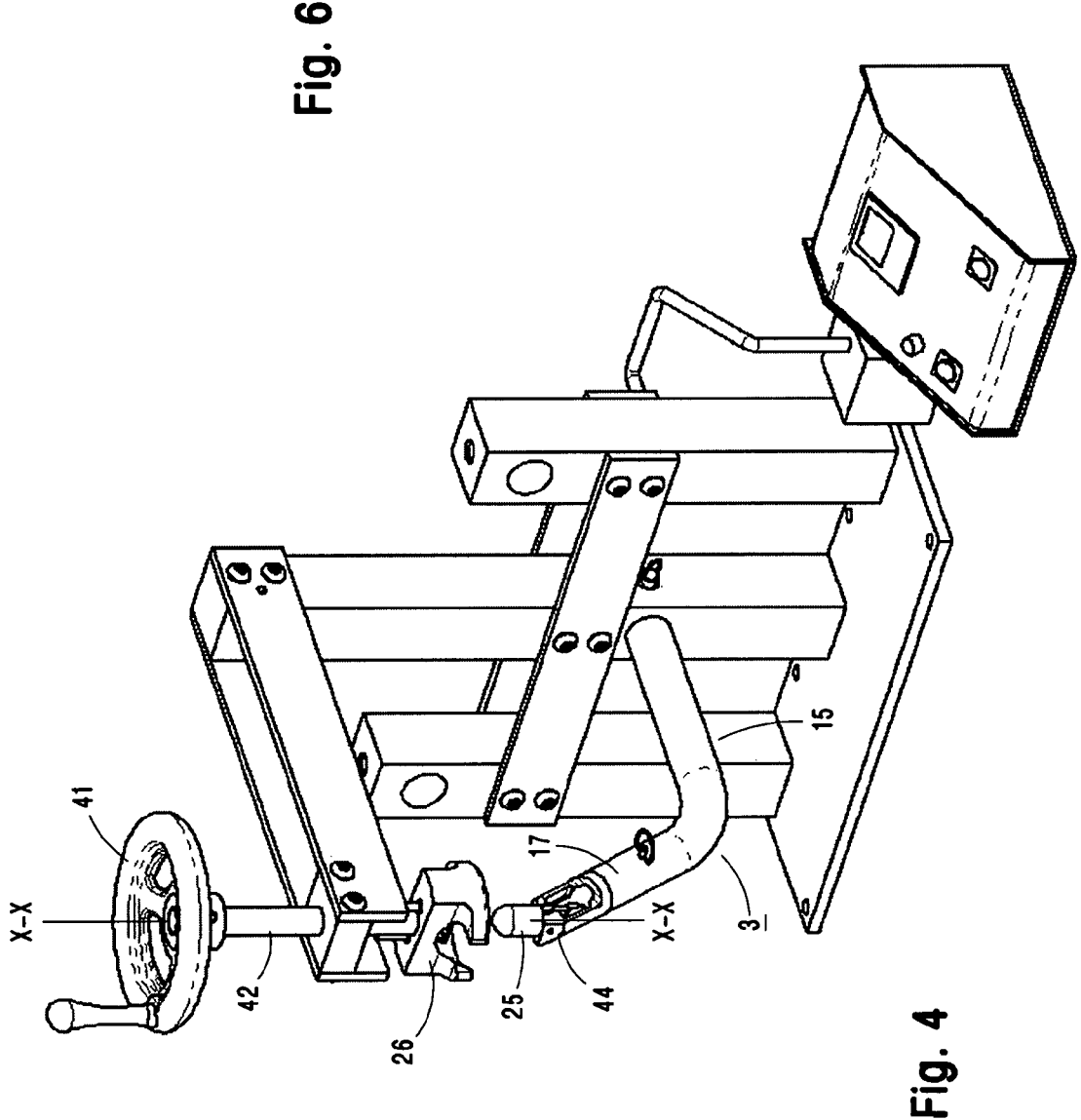
Figure 5:
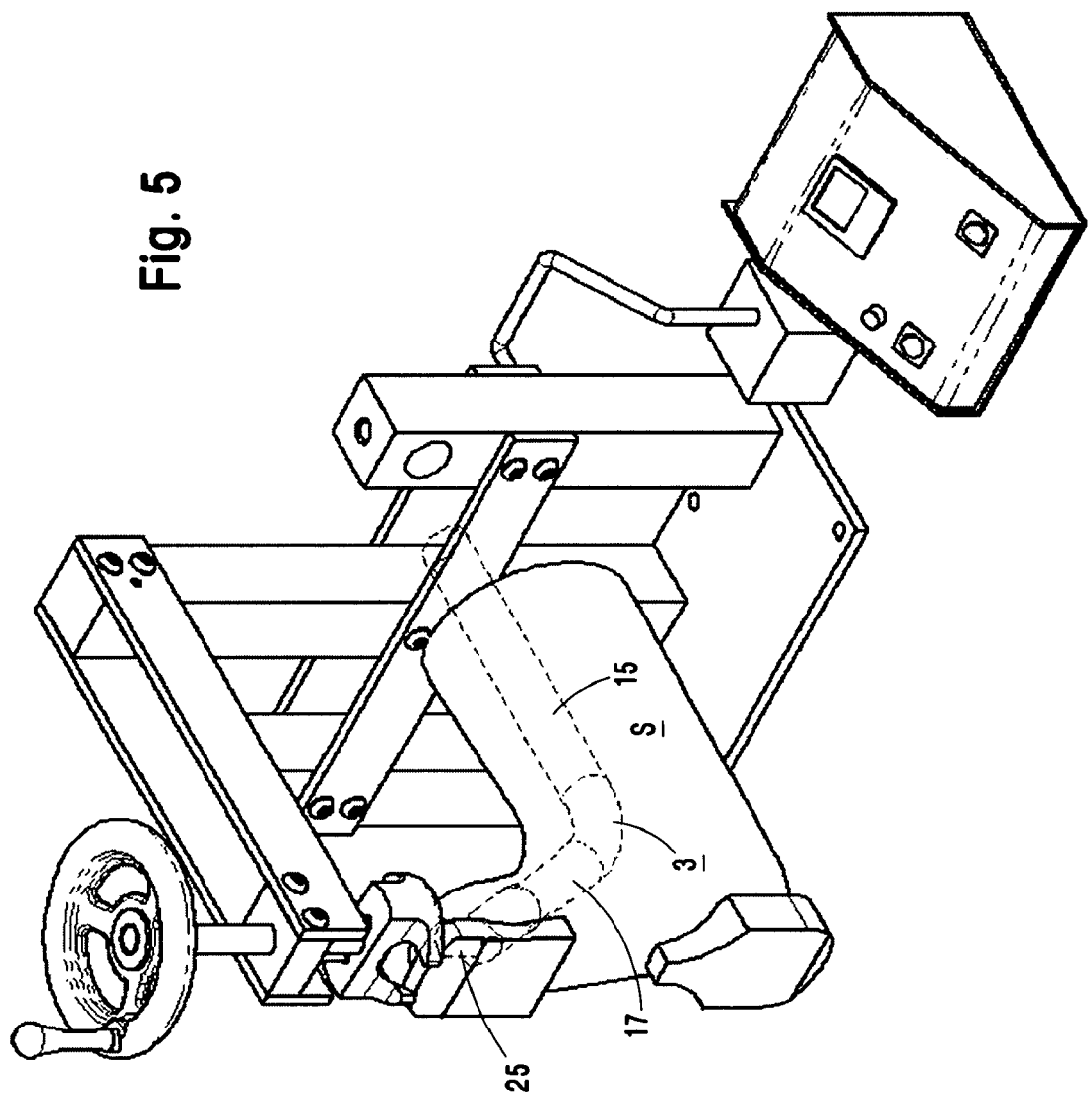
FIG. 5 is an isometric view showing the internal support arm and mold of FIG. 4 positioned within the toe portion of a shell.

Referring to FIGS. 4-6, when the toe area of a footwear shell needs reshaping or stretching, the static mold assembly 3 is coupled within aperture 11 in frame member 10. The support arm assembly is rotated 90° with respect to the coupled position in frame members 8 and 9 so that the second leg 17 of the support arm 15 points in a substantially upward direction to place the internal static mold 25 in alignment with the complementary exterior moveable mold 26 along the common axis X-X. In such an instance the alternate adapter 44 shown in FIG. 6, a bifurcated end 45 is releasably fixed to leg 17 so that the internal static mold 25 is positioned vertically in alignment along the common X-X axis with complementary external mold 26. Bifurcated end 45 provides a horizontal surface 46 for attaching the internal mold. As shown in FIG. 5, when a footwear upper or shell S is placed over the static mold assembly 3, the vertically extending leg 17 provides access into the toe area of shell S and the curved or angled configuration provided by the support arm 15 provides a reach, into the toe region heretofore unavailable in prior art reshaping devices, and accordingly the internal static mold 25 can be placed at toe positions that are unobtainable with the prior art devices.

Figure 16:
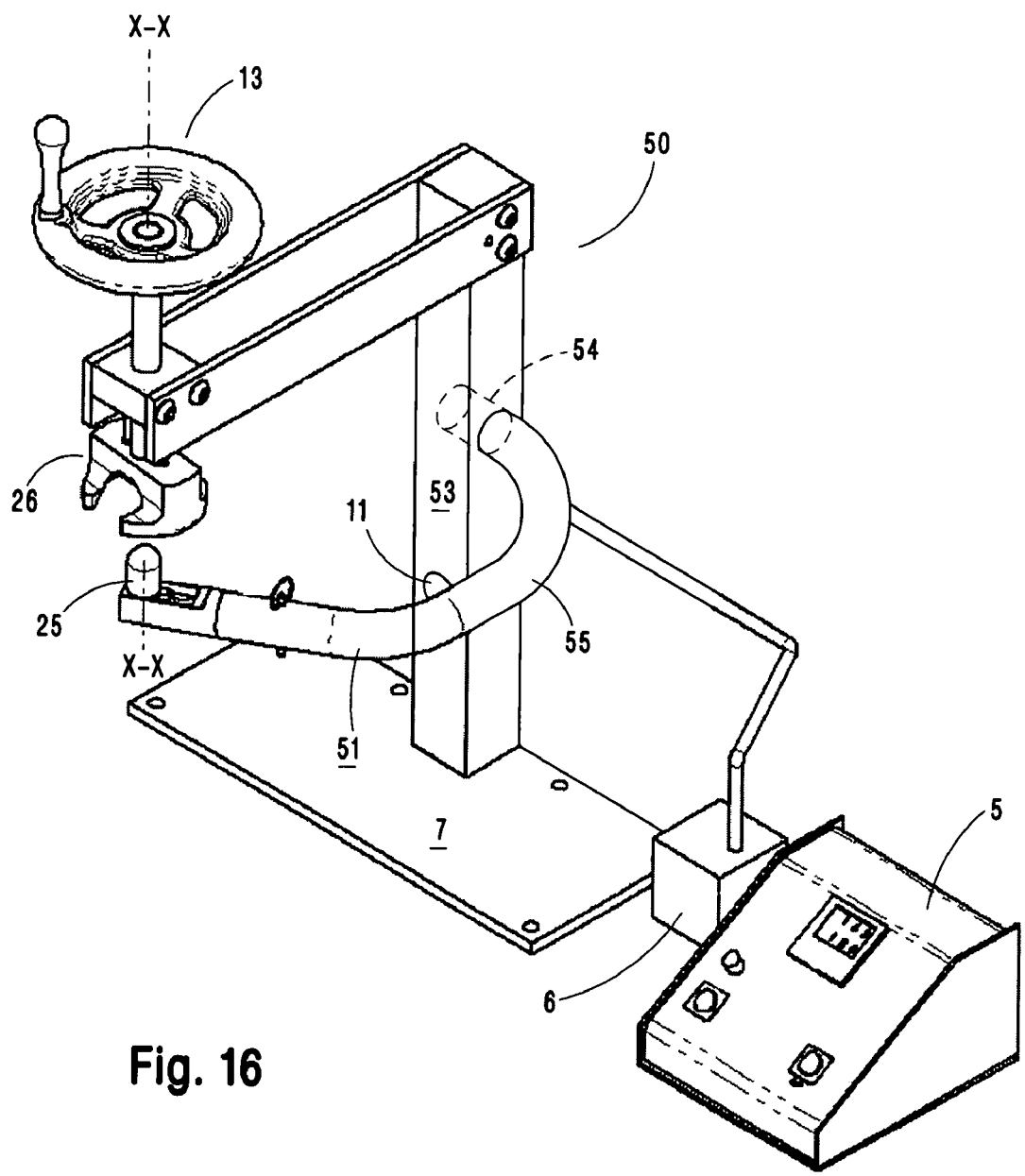
FIG. 16 is an alternate embodiment of the present invention.

Referring to FIG. 16 an alternate embodiment of the present footwear reshaping invention comprises a support structure 50, an interior static mold assembly 51, an exterior moveable mold assembly 26, the control box subassembly 5, and the coolant source 6.

The support structure 50 includes base plate 7 and a single frame member 53, extending in an upward direction from base plate 7. An aperture 54 extends from the left side through to the right side frame member 53, and the aperture is adapted to receive and demountably couple to the interior static mold assembly 51 so that the interior mold assembly 3 in a substantially horizontal position extending from either the left or right side of frame member 53. Drive mechanism 13 is attached to frame member 53 as disclosed in the preferred embodiment, and the first leg 55 of the interior static mold assembly 51 is curved so that the interior static mold 25 is maintained in alignment with the complementary exterior moveable mold along the common X-X axis. Positioning of the interior mold 25 within a footwear upper or shell will be similar to the disclosure for the preferred embodiment. Although the alternate embodiment simplifies the support structure, the apparatus is somewhat less desirable than the preferred embodiment because the longer length of the interior static mold assembly 51 increases the bending moment when downward force is applied by the drive mechanism during shell reshaping or stretching.

Many other mechanical adaptations may be employed without departing from the principles of this invention. For example, this invention could be employed while using a single vertical back plate from which to mount the frame extension bar and the internal support arm instead of the base plate and frame uprights. Such mechanical adaptations, and others, could be employed depending upon fabrication costs.

We claim:

1. Apparatus for reshaping a footwear shell, comprising:
   a. a support structure;
   b. a drive mechanism associated with said support structure;
   c. an external mold assembly, said external mold assembly fixed to said drive mechanism, said external mold assembly moveable toward or away from the shell along an axis of force through said drive assembly and said external mold assembly; and
   d) an internal mold assembly comprising;
      i. a support arm capable of reshaping a one piece boot, said support arm having a first leg adapted to demountably couple to said support structure and a second leg offset at an angle θ from said first leg, said second leg offset to extend and intersect said axis of force in a plane that is perpendicular to the axis of force;
      ii. an adapter rotatably fixed to said second leg of the support arm; and
      iii. a static mold removably fixed to said adapter and coaxially aligned with said axis of force;
   whereby the second leg offset to extend in a plane perpendicular to said axis of force provides a support arm that improves placement of said static mold within a one piece footwear shell during reshaping.

2. The apparatus recited in claim 1, said external mold assembly, comprising:
   a. a mold body having a cavity therein shaped to provide a complementary mold surface to said static mold; and
   b. a locater plate housed within said mold body, said locater plate extendable into said cavity along said axis of force, said locater plate including an aperture that provides a line-of-sight to a target on the shell when said locater plate is in an extended position.

3. The assembly recited in claim 2, said locater plate, comprising: at least one measurement shaft slideably captured within an aperture extending from said cavity to an outside surface of said mold body, said at least one measurement shaft capable of maintaining said locater plate at an extended or retracted position within said cavity.

4. The assembly recited in claim 3, wherein said at least one measurement shaft is calibrated to provide a linear measurement indicative of an amount of reshaping at said shell target.

5. The apparatus recited in claim 1, comprising a support arm having an angle θ between about 15° and about 90°.

6. The apparatus recited in claim 1, comprising a support arm having an angle θ between about 45° and about 75°.

7. The apparatus recited in claim 1, comprising a support arm having an angle θ of about 60°.

8. The apparatus recited in claim 1, wherein: said support leg is tubular to provide a conduit that extends through said first leg, said second leg, and into a chamber provided in said adapter, said chamber including at least one orifice that extends from said chamber to an exterior surface of said adapter proximate said axis of force.

9. The apparatus recited in claim 1, wherein: said support structure comprises at least three frame members, said demountable first leg of the support arm selectively coupled to any one of said at least three frame members to improve placement of the static mold within the footwear shell during reshaping.

10. The apparatus recited in claim 8, wherein said adapter includes a pin coaxially aligned with said axis of force, said pin adapted to releasably fix said static mold to said adapter about said axis of force.

11. The apparatus recited in claim 10, wherein said coaxial pin includes a heating element and thermocouple attached to a heat source control.

12. The apparatus recited in claim 10, wherein said adapter includes a plurality of indexing apertures radially spaced apart about said coaxial pin, each said indexing pin adapted to receive an indexing pin extending outward from said static mold.

13. The apparatus recited in claim 1, wherein said support arm has a total length between about 25 cm and about 60 cm in combination with said angle θ so that said static mold is coaxially aligned with said axis of force when positioned within a one piece footwear shell.

14. The apparatus recited in claim 1, wherein said support arm has a preferred total length between about 36 cm and about 40 cm in combination with said angle θ so that said static mold is coaxially aligned with said axis of force when positioned within a one piece footwear shell.

15. The apparatus recited in claim 8, comprising a controlled coolant source to deliver coolant through said conduit provided in the support arm and into said adapter chamber, said coolant discharged from said at least one orifice onto said static mold and the footwear shell.

16. The apparatus recited in claim 15, wherein said coolant is compressed air.

17. Apparatus for reshaping footwear, comprising:
   a) a support structure;
   b) a drive mechanism;
   c) an external mold fixed to said drive mechanism, said external mold moveable along an axis of force through the reshaping apparatus, said external mold including a cavity that provides a concave mold surface and a combination target area locater and shape measurement device, said combination device comprising;
      i. a locater plate fitted within a pocket provided in said external mold, said pocket communicating with the mold cavity, said locater plate having an aperture that provides a line-of-sight to a footwear target area when the locater plate is extended from said pocket into the mold cavity and placed on the target area, and ii. at least one measurement shaft having calibrations along a length thereof to provide linear measurement indicative of shape change at the target area, said at least one measurement shaft slideably captured within an aperture that extends from said pocket to an outside surface of the external mold, said at least one measurement shaft having a first end fixed to said locater plate to provide means to extend or retract the locater plate, said at least one measurement shaft having a second end extending outside said aperture so that the calibrations are visible; and d) an internal mold assembly comprising; a support arm demountably coupled to said support structure, a mold adapter fixed to said support arm, and an internal mold coupled to said mold adapter, said internal mold having a convex mold surface.

18. Apparatus for reshaping footwear, comprising:
a) a support structure;
b) a drive mechanism;
c) an external mold fixed to said drive mechanism, said external mold moveable along an axis of force through the reshaping apparatus;

d) an internal mold assembly comprising;
  i. a tubular support arm that provides a conduit, said support arm demountably coupled to the support structure,
  ii. a mold adapter fixed to said tubular support arm, said mold adapter including a chamber with orifices that extend from the chamber to an outside surface of the mold adapter, said chamber communicating with said conduit to provide a passageway for a coolant delivered to a footwear target area located proximate said orifices,
  iii. a temperature control system that communicates through said conduit with a thermocouple and heating element associated with said mold adapter to control target area temperature during heating and cooling cycles while the target area is reshaped, and
  iv. an internal mold fixed to said mold adapter along the axis of force through the reshaping apparatus, said internal mold heated and monitored by said temperature control system while the target area is reshaped.

* * * * *